Nov. 16, 1954
H. W. HEIN
2,694,379
TEAT CUP FOR MILKING MACHINES
Filed Nov. 21, 1951
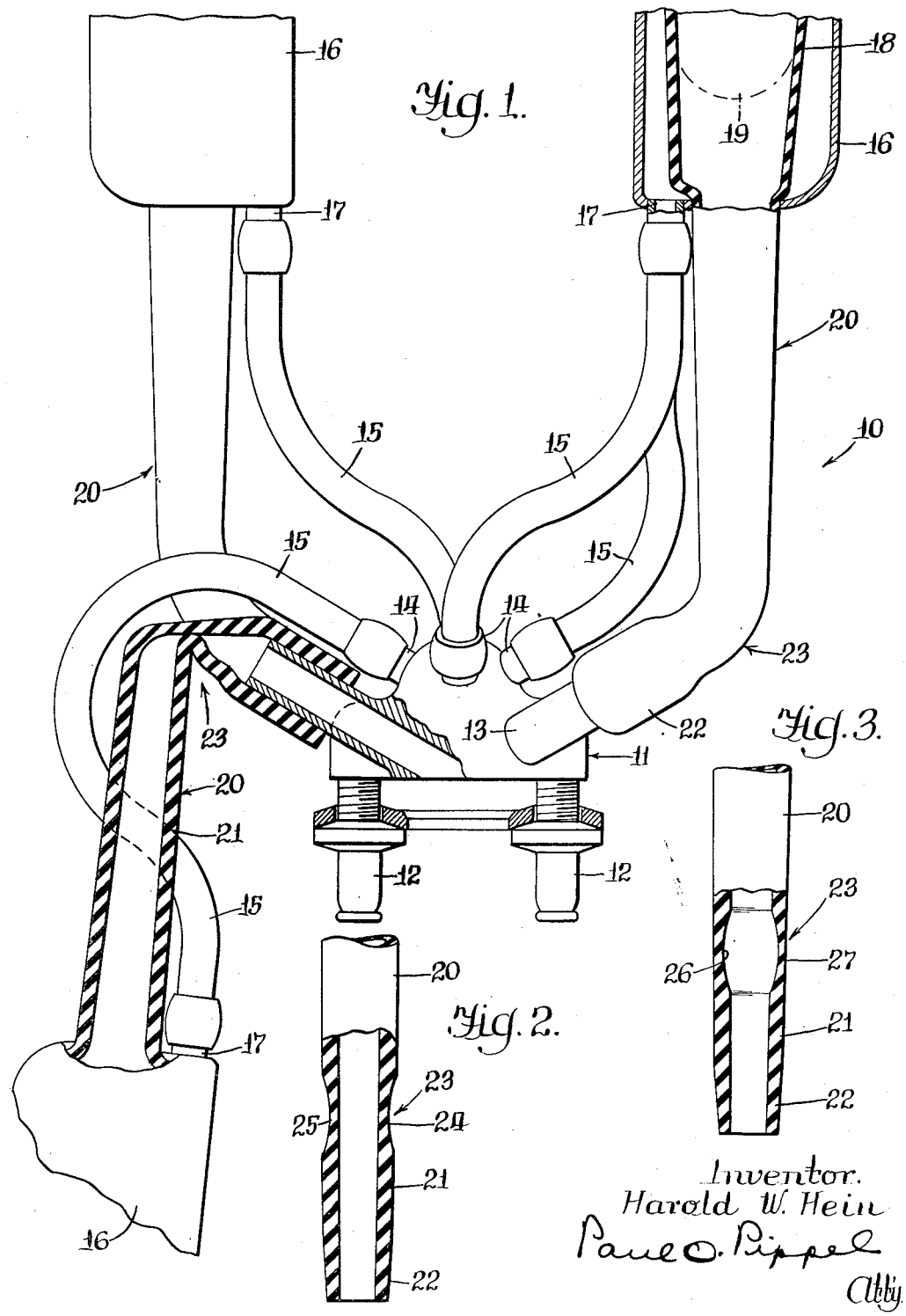
Inventor.
Harold W. Hein
Paul O. Pippel
Atty

United States Patent Office 2,694,379
Patented Nov. 16, 1954

2,694,379

TEAT CUP FOR MILKING MACHINES

Harold W. Hein, Chicago, Ill., assignor to International Harvester Company, a corporation of New Jersey Application November 21, 1951, Serial No. 257,567

5 Claims. (Cl. 119—14.47)

This invention relates to a milking machine. More particularly the invention relates to a teat cup of the type used in connection with vacuum milking systems.

A conventional teat cup construction for a vacuum milking machine generally consists of a metal casing within which a rubber cup or inflation is positioned. The metal casing is provided at its lower end with an opening through which the neck or tubular conduit of the teat cup projects. The neck is usually integrally formed with the rubber inflation, the neck being open at one end and being adapted to connect to the connecting nipple of a milker claw of a milking machine. The milker claw in turn is provided with flexible conduits which direct the milk to a milker pail. During the normal operation the teat cup is suspended from the teats of the cow, the vacuum suction within the system being sufficient so that the teat cup is firmly connected to the animal's udder during a normal milking operation. Under certain conditions it is possible that one or more of the teat cups will lose their vacuum engagement with the teats of the animal and therefore drop from connection therewith. When this occurs the inflations of the teat cups are, of course, exposed to the atmosphere and this exposure will quickly cause a drop in the vacuum system, this occurrence having a deleterious effect on the teat cups which are or remain connected with the cow. In order to prevent this drop in the vacuum, due to certain of the cups falling from the teats of the animal, constructions have been made wherein the rubber necks of the teat cups are suitably crimped when they drop from engagement with the cow's teats so that they are sealed off with respect to the milker claw and therefore the vacuum within the system can be maintained. Such a construction is shown in the Dinesen Patent 2,484,696, patented October 11, 1949. In this construction the milker claw is provided with an upwardly extending nipple or connecting member to which the end of the teat cup neck is connected. The upwardly extending nipple is formed with an enlarged end portion which accomplishes a crimping action on the neck of the teat cup when the teat cup is suspended solely from the claw after it has dropped off the teat of the animal. The type of construction shown in this patent has been effective to shut off the open communication between the teat cup and the claw so that the vacuum is maintained within the system. In order to accomplish the crimping action of the suspended neck of the inflation it has been necessary to design the nipple of the claw in a special manner. The upper end of the nipple is cut off in an angular plane with respect to the axis of the nipple. In view of the tubular construction of the nipple this leaves a relatively sharp surface at the end of the nipple and this surface has a tendency to cut through the relatively thin walls of the neck of the inflation. Thus, in many instances, the neck of the inflation is pierced within a relatively short time or period of use and thus the entire inflation has to be discarded. Since the milker claw is generally suspended beneath or adjacent to the animal it also is subject to a certain amount of swinging movement and in many instances the end of the nipple is bumped in such a manner that the thin wall of the neck of the inflation is cut through and is thus rendered useless. It is a prime object of this invention, therefore, to provide an improved milker inflation having a neck designed in a manner wherein the neck is readily crimped to shut off communication between the inflation and the milker claw when the inflation drops from the teats of the cow and is suspended from the milker claw, the crimping action being effective without the utilization of a special design nipple construction.

Still another object is to provide an improved milker inflation adapted to be suspended from the nipple of a milker claw, the inflation including a neck having an open end adapted to connect to the nipple, the neck including a wall of substantially constant thickness in cross-section, the said wall further including a weakened portion spaced from the connecting end of the neck, the said weakened portion having a wall thickness of lesser cross-sectional thickness than the remainder of the neck.

Still another object is to provide a milker inflation having a neck integrally connected thereto, the neck and inflation consisting of a rubber-like material, the said neck having a substantially continuous wall thickness in cross-section and a weakened section spaced from the ends of the wall having an annular depression formed in the wall wherein the weakened wall is of lesser cross-sectional thickness than the remainder of the neck.

These and further objects will become more readily apparent from a reading of the specification when taken in connection with the accompanying sheet of drawings.

In the drawings:

Fig. 1 is a perspective view of a milking machine teat cup arrangement having certain portions shown in section to illustrate the invention.

Fig. 2 is a sectional view of a portion of a milker inflation.

Fig. 3 is a sectional view of a portion of a milker inflation showing a modified embodiment of the invention.

Referring particularly to Fig. 1, a milking machine teat cup arrangement is generally designated by the reference character 10. The milking machine teat cup arrangement 10 consists of a milker claw 11 which has at its lower end a pair of air and vacuum connections 12. The vacuum connections 12 may be suitably connected to a pair of flexible hoses (not shown) which in turn lead to a pulsating unit (not shown). The milker claw 11 also includes a plurality of milk nipples 13 which project upwardly and outwardly with respect to the claw 11. A plurality of vacuum and air nipples 14 are connected to the claw, these nipples 14 being in communicating connection with a plurality of vacuum and air hoses 15. The vacuum and air hoses 15 are in communication with the interior of a teat cup casing 16 by means of nipples 17 connected to the ends of the vacuum and air hoses 15. A rubber teat cup inflation 18 is positioned within each casing 16. The rubber inflation 18 is adapted to receive the teat of an animal generally designated at 19.

The rubber inflation is provided with a neck or conduit 20 which is integrally formed with the rubber inflation 18 and projects outwardly from the casing. The neck or conduit 20, as shown in Figs. 1 and 2, consists of a wall 21 which is provided at its lower end with a connecting portion 22. The wall 21 is of a substantially continuous thickness in cross-section throughout its length but is provided intermediately at its ends with a weakened portion generally designated at 23. The weakened portion 23 is formed by an annular recess 24 disposed in the outer peripheral surface of the wall 21 as indicated in Fig. 2. Thus the wall 21 is of a substantially continuous thickness in cross-section except insofar as the weakened portion 23 is concerned. The connecting portion 22 as best indicated in Fig. 2 also has a tapering outer surface which facilitates connection of the neck 20 to the milk nipple 13.

The neck 20 shown in the modified embodiment of Fig. 3 has the inner portion of the wall 21 formed with an annular recess 26, the wall 21 at this point being of considerably less thickness in cross-section, thus providing for the weakened condition or portion at this point. The weakened portion 23, in both the preferred embodiment and in the modification, is positioned in spaced relation with respect to the connecting portion 22 but substantially adjacent thereto.

As best shown in Figure 1, two of the teat cup casings are shown in the normal position wherein they are suspended from the teats 19 of a cow. One of the casings 16, however, has dropped from connection with the animal and upon this occurrence it can be seen that the weakened portion 23 causes crimping of the neck 20 at a point removed from the nipple 13 so that the neck 20 is blocked from communication with the atmosphere. Thus the vacuum within the milking system may be maintained despite the fact that one or more of the teat cups has dropped from cooperative engagement with the cow's udder. In view of the weakened portion of the neck 20 the folding or crimping engagement of the neck takes place at this point immediately when the teat cup casing 16 is suspended solely from the nipple 13 of the claw 11. Thus actually three of the teat cups, of the four which are connected to the claw, may drop from engagement with the cow and since each one of the teat cup casings 16 is provided with the type of milker inflation shown, the necks of the inflations will be crimped in the manner indicated and thus the vacuum is maintained. In this type of condition, of course, the remaining teat cup which is in connection with the animal's udder will suspend the claw, from which in turn the dropped teat cup casings 16 are suspended. Suitable provisions may be made for supporting the claw independently of the cow in which case all four of the teat cup casings 16 could be dropped from the animal without effecting the vacuum within the milking system.

Thus it can be seen that the nipples 13 need not consist of any special shape but can be cut off in the conventional manner square with respect to the axis of the nipple. The crimping action takes place at the weakened portions 23 which are spaced from the connecting portion 22 and from the nipple 13, the weakened portions being effective to suitably crimp the neck 20 so that it is properly blocked with respect to the atmosphere.

It can now be seen that the objects of the invention have been fully achieved and that changes in the preferred embodiment and in the modifications may be made without departing from the spirit of the invention as disclosed nor from the scope thereof as defined in the appended claims.

What is claimed is:

1. For a milking machine having a milker claw including a teat cup casing adapted to be suspended from the teats of an animal, an inflation adapted to be positioned in the teat cup casing, a rubber neck in communication with the inflation, said rubber neck projecting outwardly of the teat cup casing, the neck having an integral tubular wall connected at one end to said inflation, an integral connecting portion at the other end of said tubular wall adapted to connect to said milker claw for communication therewith, said tubular wall having a first portion of a substantially constant thickness in cross section between the inflation and the connecting portion, and a second weakened tubular wall portion disposed immediately adjacent the connecting portion of said tubular wall, said second weakened wall portion being of a substantially lesser thickness in cross section, said second weakened wall portion being adapted to crimp and block communication between the inflation and the claw when said teat cup casing is suspended from said claw and the connecting portion is disposed in angular relation relative to said tubular wall.

2. A milker inflation for milking machines comprising a rubber body adapted to receive the teat of an animal, a tubular rubber neck on said body, said neck having an open end adapted to be connected to a tubular connecting member of a milking machine for communication therewith, said rubber neck having a first wall portion of substantially constant thickness in cross section throughout its length, and a second weakened wall portion on said neck disposed between the open end and said inflation, said second weakened wall portion including an annular depression formed on the peripheral surface of said neck, said second weakened wall portion being of lesser cross-sectional thickness than the first wall portion of the neck, whereby said neck may be readily folded to block communication between the inflation and the tubular connecting member of a milking machine.

3. A milker inflation for milking machines comprising a rubber body adapted to receive the teat of an animal, a tubular rubber neck on said body, said neck having an open end adapted to be connected to a tubular connecting member of a milking machine for communication therewith, said rubber neck having a first wall portion of substantially constant thickness in cross section throughout its length, and a second weakened wall portion on said neck disposed between the open end and said inflation, said second weakened wall portion including an annular depression formed on the inner peripheral surface of said neck, said second weakened wall portion being of lesser cross-sectional thickness than the first wall portion of the neck, whereby said neck may be readily folded to block communication between the inflation and the tubular connecting member of a milking machine.

4. A milker inflation for milking machines comprising a rubber body adapted to receive the teat of an animal, a tubular rubber neck on said body, said neck having an open end adapted to be connected to a tubular connecting member of a milking machine for communication therewith, said rubber neck having a first wall portion of substantially constant thickness in cross section throughout its length, and a second weakened wall portion on said neck disposed between the open end and said inflation, said weakened wall portion including an annular depression formed in the wall, said second weakened wall portion being of lesser cross-sectional thickness than the first wall portion of the neck, whereby said neck may be readily folded to block communication between the inflation and the tubular connecting member of a milking machine.

5. A milker inflation in accordance with claim 4, said second weakened wall portion being formed adjacent to but in spaced relation from the open end of said neck.

References Cited in the file of this patent

UNITED STATES PATENTS

| Number | Name | Date |
|---|---|---|
| 1,995,283 | Schmitt | Mar. 19, 1935 |
| 2,079,435 | Dinesen | May 4, 1937 |
| 2,099,884 | Green | Nov. 23, 1937 |
| 2,324,999 | Shinn | July 20, 1943 |
| 2,341,953 | Scott | Feb. 15, 1944 |
| 2,572,658 | Perkins | Oct. 23, 1951 |